United States Patent [19]

Mical et al.

[11] Patent Number: 4,969,647
[45] Date of Patent: Nov. 13, 1990

[54] INVERTIBLE HAND-HELD ELECTRONIC GAME APPARATUS

[75] Inventors: Robert J. Mical, Foster City; David S. Morse, Saratoga; David L. Needle, Alameda, all of Calif.

[73] Assignee: Atari Corporation, Sunnyvale, Calif.

[21] Appl. No.: 360,385

[22] Filed: Jun. 2, 1989

[51] Int. Cl.⁵ .............................................. A63F 9/00
[52] U.S. Cl. .................................. 273/85 G; 273/1 E; 273/DIG. 28
[58] Field of Search .................. 273/85 G, 85 R, 1 E, 273/313, DIG. 28; 340/727; 368/82

[56] References Cited

U.S. PATENT DOCUMENTS

| | | | |
|---|---|---|---|
| 3,521,228 | 1/1967 | Congleton et al. | 340/727 |
| 4,359,222 | 11/1982 | Smith, III et al. | 273/85 G |
| 4,373,722 | 2/1983 | Rite et al. | 273/85 G |
| 4,391,444 | 7/1983 | Bromley | 273/85 G |
| 4,570,158 | 2/1986 | Bliegh et al. | 390/727 |
| 4,580,782 | 4/1986 | Ochi | 273/DIG. 28 |
| 4,687,200 | 8/1987 | Shirai | 273/148 B |
| 4,806,920 | 2/1989 | Sawada | 340/727 |
| 4,848,744 | 7/1989 | Steininger et al. | 273/1 E |

FOREIGN PATENT DOCUMENTS

| | | | |
|---|---|---|---|
| 53-147441 | 12/1978 | Japan | 340/727 |
| 55-43421 | 3/1980 | Japan | 368/82 |
| 56-74765 | 6/1981 | Japan | 368/82 |
| 59-87541 | 5/1984 | Japan | 340/727 |

Primary Examiner—Edward M. Coven
Assistant Examiner—Valerie Szczepanik
Attorney, Agent, or Firm—Michael L. Sherrard; Robert B. Chickering

[57] ABSTRACT

An invertible, hand-held, electronic game apparatus having a manually engageable housing, a display screen mounting in the housing, an electronic circuit electrically connected to drive the display screen, and a control switch assembly mounted for manipulation by at least one hand of the player while holding the housing. The control switch assembly includes a joypad and fire buttons which are positioned on the housing to permit rotation or inverting of the housing and operation of the switches in a rotated position. Inversion of the housing and operation of the switches is possible when the images are vertically or horizontally oriented. In the preferred form, the control switch assembly includes a joypad on one side of the display screen and two pairs of functionally duplicate fire buttons symmetrically positioned about a central plane of the housing on an opposite side of the screen. The back of the housing is formed with protruding convex surfaces to facilitate gripping.

20 Claims, 3 Drawing Sheets

INVERTIBLE HAND-HELD ELECTRONIC GAME APPARATUS

TECHNICAL FIELD

The present invention relates, in general, to hand-held electronic game apparatus, and more particularly, relates to hand-held electronic game apparatus having image controlling switch assemblies, such as, a joypad switch assembly and fire buttons.

BACKGROUND ART

In recent years the popularity of hand-held electronic games has increased substantially. Typically these games have a display screen on which images of the game can be displayed, and control switches which allow the player to manipulate the images. Often such switches include a joystick or joypad assembly with directional controls for the images, as well as "fire" buttons that enable certain game features to be activated.

Typical of prior art hand-held electronic game assemblies and of the joypad controllers used for image control is the device set forth in U.S. Pat. No. 4,687,200 to Shirai. In the Shirai patent a joypad mounting assembly is disclosed which enables control of images on the game screen in a manner similar to a joystick. The joypad is built into the housing of the game apparatus and protrudes slightly from the housing by a distance sufficient to enable manual manipulation, usually by the thumb of the user.

Still more recently, hand-held electronic game assemblies have become more popular as a result of the ability to use ROM-cards in combination with the hand-held apparatus to greatly increase the variety and complexity of games that can be played. As the versatility and capacity of such game equipment increases, players tend to use the game equipment for longer and longer periods of time.

Prior electronic game apparatus, however, have been found to have certain ergonomic disadvantages. First, such game apparatus are typically constructed for use by right-handed players. Thus, left-handed players are at a disadvantage, particularly when the same game equipment is used in competitions between two players. Moreover, even for right-handed players, there is usually only one set of hand positions that are suitable for holding the game and operating the various control switches. Accordingly, player fatigue often is the result of the single-position ergonomics of conventional electronic game apparatus.

Finally, prior hand-held electronic game apparatus housings have not been well matched to the user's hands. Typically, the hand-held games are contained in generally rectangular housings, and they are held in the palm of one hand while the other hand manipulates the control switches. Alternatively, the larger electronic game apparatus can be hand-held or placed on a support surface during game operation.

The housing itself, however, is not adapted for gripping, and as a result the gripping pressure on such housings is usually undesirably high. Thus, gripping of hand-held game assembly housings can produce fatigue and interfere with manipulation of the various control switches.

Accordingly, it is an object of the present invention to provide a hand-held electronic game apparatus which is constructed to allow play by both right-handed and left-handed players.

A further object of the present invention is to provide a hand-held electronic game apparatus which can be rotated by 180° to invert the position of the control switching assemblies.

Another object of the present invention is to provide an electronic game apparatus which can be hand-held in a plurality of hand positions while still permitting the user easy access to operate the control switches.

Still a further object of the present invention is to provide a hand-held electronic game apparatus which is easier to grip and has ergonomically efficient positions for the control switches.

Still a further object of the present invention is to provide a hand-held electronic game apparatus in which the screen may be horizontally or vertically oriented during play of the game.

An additional object of the present invention is to provide a hand-held electronic game apparatus which is easy to use, has improved control switch positioning, is relatively inexpensive to construct and reduces user fatigue.

The hand-held invertible electronic game apparatus of the present invention has other objects and features of advantage which will become apparent from and are set forth in more detail in the accompanying drawing and following description of the Best Mode of Carrying Out the Invention.

DISCLOSURE OF INVENTION

A hand-held electronic game apparatus is provided which includes a manually engageable housing, a display screen mounted in the housing, and a control switch assembly mounted for manipulation by one hand of a player while holding the housing. The improvement in the hand-held electronic game apparatus of the present invention is comprised, briefly, of the housing being formed for gripping in a plurality of rotated orientations, and the control switch assembly being positioned relative to the housing to permit rotation of the housing to a position enabling manipulation of the switch assembly by the either hand of the player. Preferably, an assembly for rotating images on the display screen by an amount corresponding to rotation of the housing is provided for selective inversion of the housing and use of the game apparatus with right-handed or left-handed manipulation of the control switch assembly. In the preferred form, the switch assembly includes a joypad on one side of the display screen and at least a pair of duplicate fire control buttons on the other side of the display screen.

BEST MODE OF CARRYING OUT THE INVENTION

Figure 1:
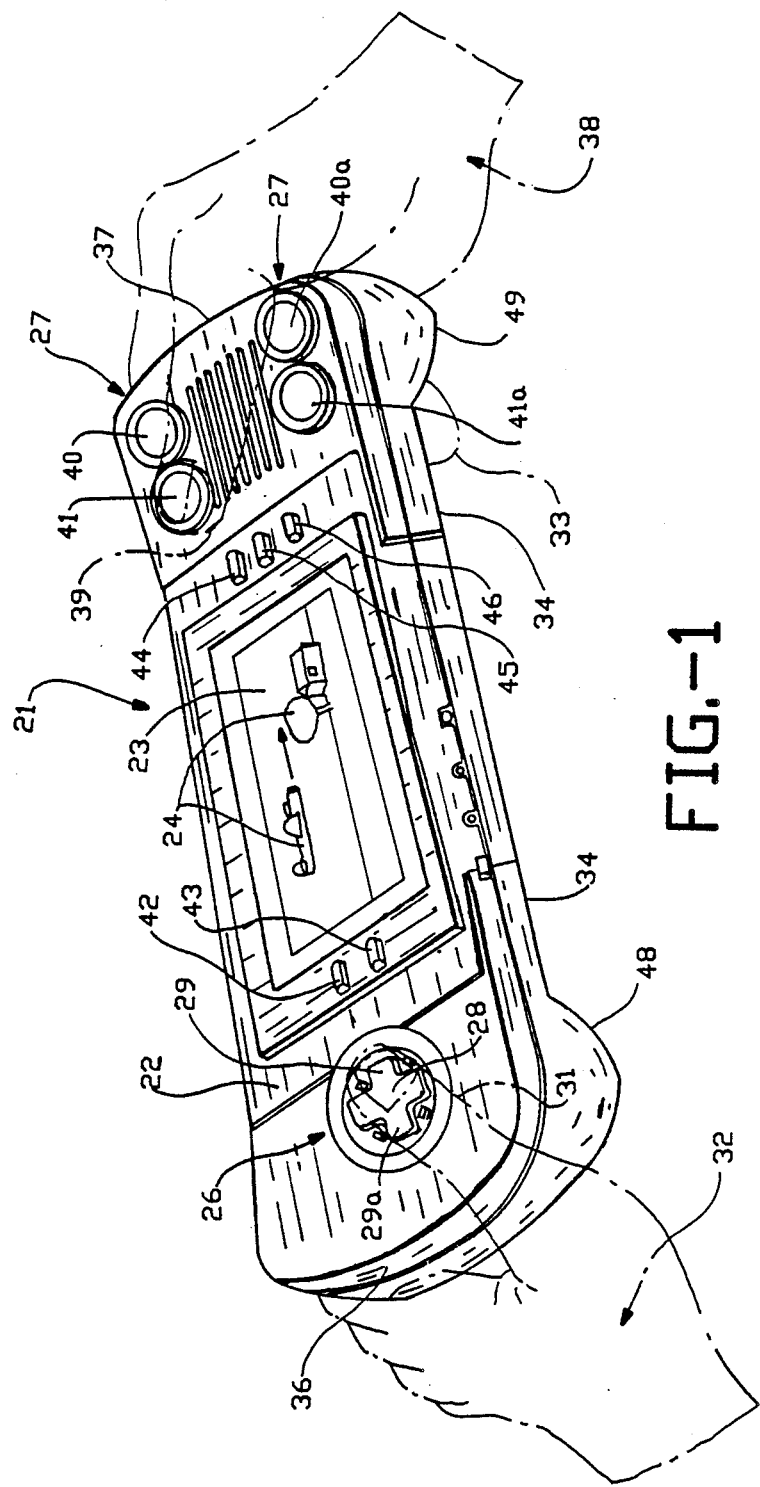
FIG. 1 is a top perspective view of a hand-held electronic game apparatus constructed in accordance with the present invention.

In the preferred form, game apparatus, generally designated 21, of the present invention includes an elongated housing 22 having a display screen 23 mounted centrally therein. Internally of housing 22 is an electronic circuit which includes a CPU, switch means, and a battery (or an electric cord to outside power), as is conventional for electronic game apparatus. The construction and operation of the electronic apparatus inside housing 22 and the construction and operation of display screen 23 are well known in the art and will not be repeated in detail herein.

Typically, such electronic game apparatus will include control switch means electrically connected to control the display of images 24 on screen 23. As shown in the drawing, the control switch means in the game includes a first control switch assembly, generally designated 26, and a second control switch assembly, generally designated 27. First control switch means 26 controls a first function of images 24 on the display screen, for example, the direction of movement of the images. Second control switch means 27 can control a variety of features of operation of the display screen, including, for example, the firing of weapons, dropping of bombs or control of speed of image movement. Most typically, second control switch means 27 are provided as "fire" button switches 40 and 41, which are used to fire weapons, for example, weapons carried by a movable image that has its motion controlled by the first control switch means 26.

As shown in the drawing, first control switch means 26 may be a multi-directional control switch assembly which is provided by a cruciform pad 28 having a plurality of laterally-extending arms 29 that can be depressed to control motion of images on screen 23. Such assemblies are known in the industry as "joypad" assemblies and are described in detail in U.S. Pat. No. 4,687,200. The construction and operation of such joypad assemblies is not regarded as a novel portion of the electronic game apparatus of the present invention. Generally, joypads are operated by pushing down on one or more of arms 29 to effect movement of the image in the same direction as the arm which is being depressed. Diagonal movements are achieved by depressing two adjacent arms at the same time.

Operation of joypad 28 is usually accomplished by engaging and manipulating the joypad by means of thumb 31 of one hand 32 of the user. The fingers of hand 32 engage the back side 34 of the housing to effect gripping of the same. As shown in FIG. 1, left hand 32 is operating joypad 28 while gripping the left end 36 of housing 22.

In order to provide enhanced stability, opposite end 37 of housing 22 is gripped by the right hand 38 of the player. The player's right thumb 39 is positioned for engagement and operation of either or both of the upper fire button 40 or 41, and fingers 33 of the right hand extend around and engage back side 34 of housing 22.

Figure 2:
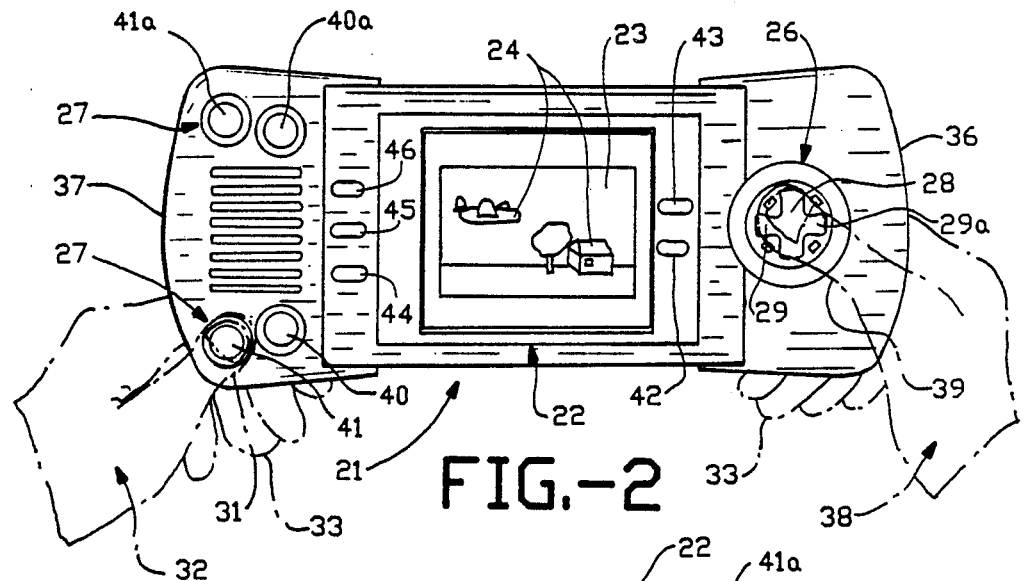
FIG. 2 is a front elevation view corresponding to FIG. 1 of the apparatus of FIG. 1 with the screen inverted from the position of FIG. 1.
Figure 3:
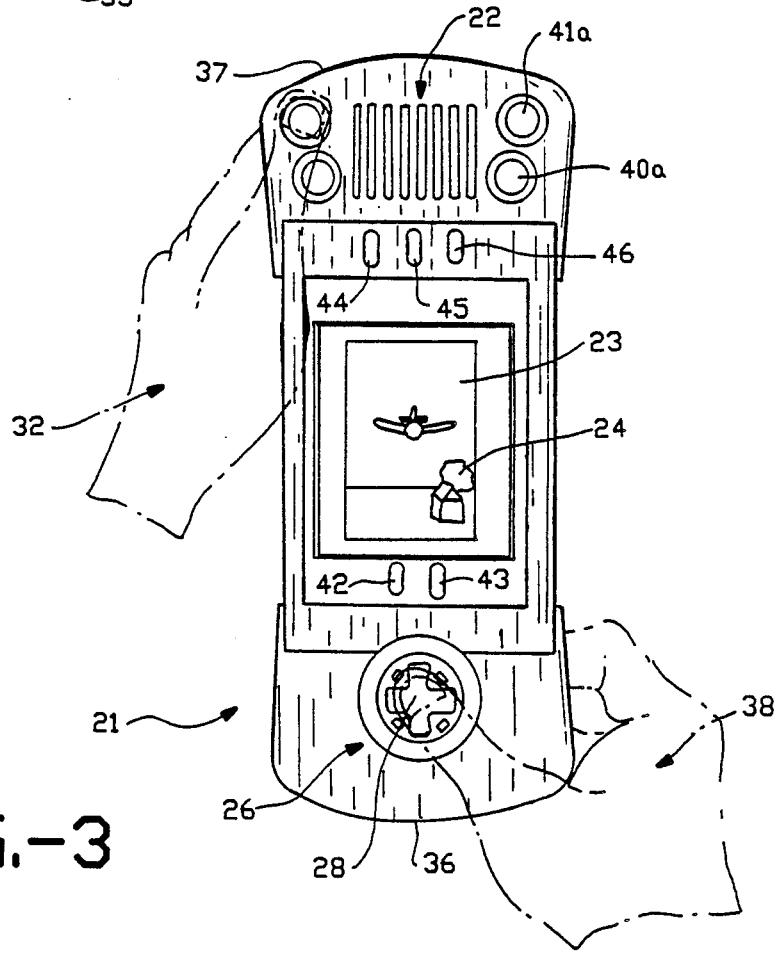
FIG. 3 is a front elevation view of the apparatus of FIG. 1 shown while being played in a vertical orientation.

In the improved game assembly of the present invention, housing 22 is formed for gripping by the player in a plurality of relatively rotated positions. Thus, in FIG. 1 screen 23 is generally horizontally oriented. In FIG. 2 screen 23 has been rotated by 180° but again is horizontally oriented. In FIG. 3, however, screen 23 is rotated by 90° from FIGS. 1 and 2 and is generally vertically oriented. As will be understood, as used herein "horizontal" and "vertical" refer to apparatus 21 as it is oriented in the drawing, but are only relative terms since game apparatus 21 can be tilted or rotated about all three axes.

In order to permit ease of switch manipulation, switch means 26 and 27 are positioned relative to housing 22 to permit rotation of housing 22 to a position enabling manipulation of the switch means by either hand of the player. Thus, as best may be seen by comparing FIG. 1 to FIG. 2, housing 22 can be rotated from the FIG. 1 position about an axis perpendicular to and through the center of display screen 23 by 180° to the position shown in FIG. 2. This rotation inverts game apparatus housing 22, and end 37 now is engaged by left hand 32 of the player while end 36 of housing 22 is engaged by right hand 38 of the player. This rotation repositions joypad 28 for operation by right thumb 39 and repositions fire buttons 40 and 41 for operation by left thumb 31 of the player. Again, fingers 33 on both hands engage back side of the housing to enable the player to easily grip and control the housing during play of the game.

As will be noted, images 24 on screen 23 in FIG. 2 are still in an upright position. Thus, the game apparatus of the present invention preferably further has circuit means for rotating the images on display screen 23 by an amount corresponding to rotation of housing 22.

Figure 4:
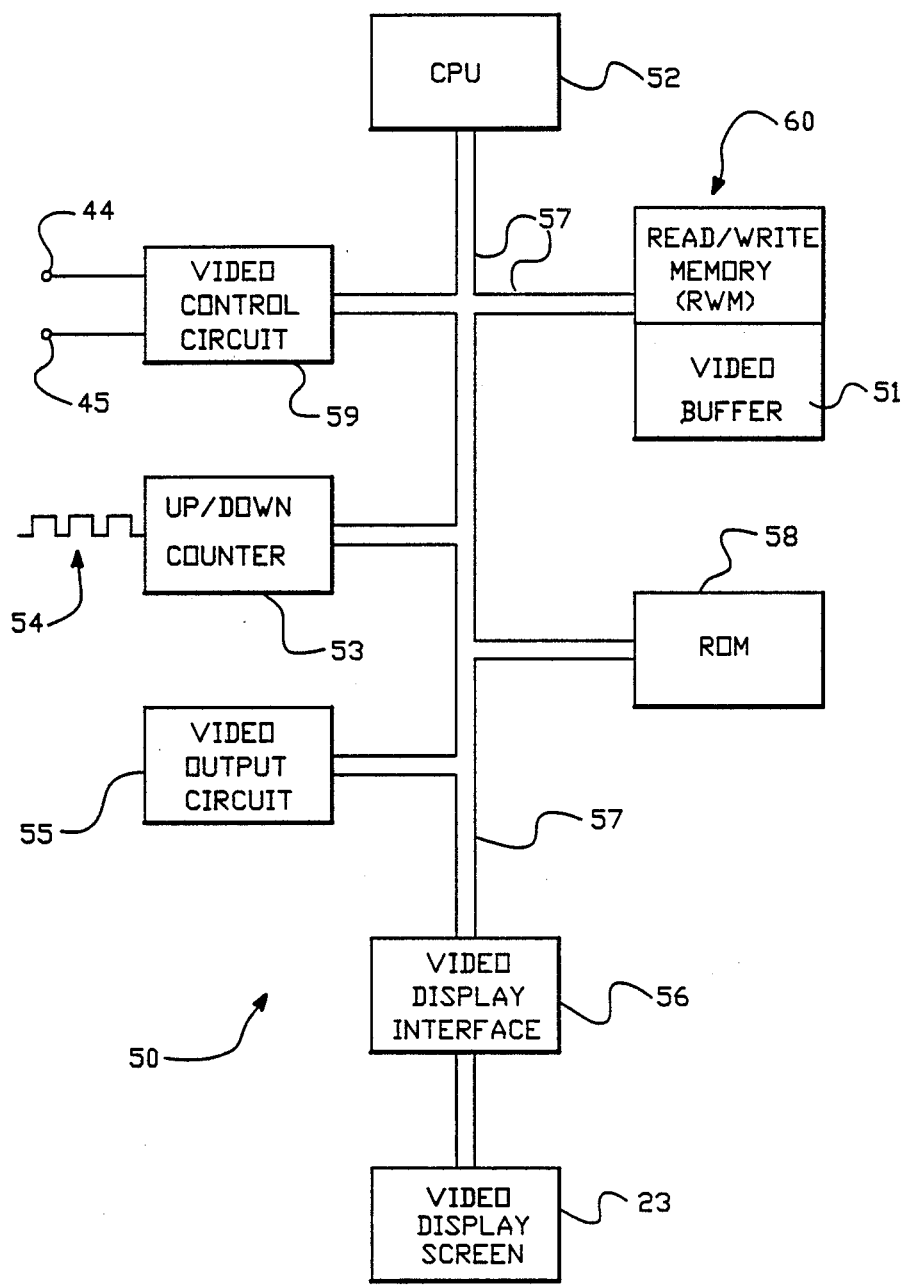
FIG. 4 is a schematic diagram of a display inversion circuit employed in the apparatus of FIG. 1.

Referring now to FIG. 4, a block diagram of a video display circuit means is shown which is suitable for rotating images 24 on display screen 23 by 180°, which corresponds to inversion of housing 22. The circuit means, generally designated 50, contains a CPU 52, ROM 58 and RWM 60 having a video buffer section 51 reserved for storing display information. Additionally, an up/down counter 53 responsive to a reference clock pulse 54, a video output circuit 55, a video display interface 56 and a video control circuit 59 are provided. A read/write data bus 57 electrically couples the circuit components for electronic communication.

The operation of circuit means 50 is known in the art and will be described only briefly herein. CPU 52 and the video control circuit 59 maintain a dual master-dormant relationship in circuit 50. When the CPU is executing video game instructions, video control circuit 59 remains dormant. Alternatively, when the video control circuit is manipulating a video display output, CPU 52 remains dormant. The timing of the master-dormant states between the CPU and the video control circuit 59 is controlled by up/down counter 53 which counts the reference clock pulses 54. At certain threshold count values of the counter, the video control circuit 59 becomes the master for a period of time for the purpose of displaying the display data. The video control circuit fetches some display data from buffer 51 and sends the data to the display interface 56. After the required time period, control is returned back to the CPU. In the preferred embodiment of the present invention, the threshold value for the counter is 8. It would be obvious, though, to those skilled in the art to use other count values of longer or shorter duration. During the intervals when the CPU is in control of circuit 50, the CPU executes the video game instructions which result in the generation and storage of video display data in buffer 51.

To generate non-inverted images, the video control circuit 59 directs the video output circuit 55 to utilize the incrementing contents of the counter to address the video buffer 51 locations in sequentially ascending order starting at the first buffer location in RWM. The addressed video data is transferred to the video interface 56 where the data is converted from digital to analog form for display on screen 23. The video data is accessed until the incrementing counter reaches a threshold value.

To implement the means for rotating the images on the display screen 23 by 180° an amount corresponding to the inversion of housing 22, the video control circuit is electro-mechanically coupled to switches 44 and 45, respectively, on the video control housing. When the video game player simultaneously presses switches 44 and 45, video control circuit 59 directs video output circuit 55 to reset counter 53 to the last RWM address. To generate inverted images, the video output circuit 55 utilizes the decrementing contents of the counter to address the video buffer 51 locations in sequentially descending order starting at the last buffer location in RWM. The addressed video data is transferred to the video interface 56 where the data is converted from digital to analog form for display on screen 23. As a result, the video image appearing on display 23 is inverted or effectively rotated by 180°.

It is a further important feature of the present invention that screen inverting switches 44 and 45 also be coupled to simultaneously invert the operation of joypad 28. In FIG. 1 when the arm 29a is depressed by the user's thumb, the movable image will move to the left on screen 23. When the housing and game apparatus are inverted, however, arm 29a is also reversed, and it would inhibit user operation if arm 29a in FIG. 2 were to move a movable image to the left. Accordingly, switch means 43 is coupled so as to cause arm 29a to control the movement of images to the right when switches 44 and 45 are closed and the housing inverted for control by the right thumb 39 of the player.

Another important feature of the present invention is the duplication of the manually manipulatable fire switches. It is preferable that game apparatus 21 include a pair of fire switches so that multiple functions can be performed. Bombs might be dropped, for example, by switch 40 and guns fired by switch 41. Accordingly, both these functions are preferably duplicated proximate opposite sides (upper and lower sides) of housing 22. Thus, a second pair of fire switches 40a and 41a, having functions which duplicate the functions of fire switches 40 and 41 also are provided. The pairs of fire switches 40 and 41 and 40a and 41a are preferably symmetrically disposed in spaced-apart relation about a horizontal plane through the center of housing 22. When housing 22 is inverted, therefore, the player has the choice of using either of fire switches 40 and 41 or 40a and 41a to actuate various display features in the game.

Even when housing 22 is not inverted, the game player has a choice of two hand positions which can be used to operate the same fire switch function. As shown in FIG. 1, the upper fire switches are being operated, while in FIG. 2 the lower fire switch 15 being operated. In FIG. 2, if the user wishes to operate the upper switches, the hand can simply be slid up the side 37 of the device to the FIG. 1 position to operate switches 40a and 41a. This affords the user multiple hand positions which reduce fatigue.

Some game software is written to display images 24 in a horizontal orientation as shown in FIGS. 1 and 2. Other software, however, displays images in a vertical orientation, as shown in FIG. 3. The ergonomic game apparatus of the present invention readily accommodates both types of image displays. As will be seen from FIG. 3, when housing 23 is vertically oriented, the user may use his right hand or left hand to reach joypad 28 with the remaining hand operating the pair of fire buttons closest to the remaining hand. Thus, even without providing the display inverting circuit means of FIG. 4, the improved housing and switch ergonomics of the present game apparatus allows the game apparatus to be readily used with software producing both horizontally oriented images and vertically oriented images. The addition of a display inversion circuit allows the housing to be inverted to right- or left-handed play in a horizontal orientation, and it allows right hand above and left hand below or right hand below and left hand above positioning when the images are vertically oriented. Thus, a left-handed player who prefers to have joy pad 28 in the lower position can invert the housing from the FIG. 3 position and flip or invert the vertically oriented images by switches 44 and 45 to invert the images.

While it is possible to provide circuit means 50 in game apparatus 21 which rotates image output by only 90°, or some amount different from 180° and yet the same as the amount of housing rotation, such circuit means generally would be more costly and complex to construct than the cost of achieving a vertical, or other angular, orientation of the images by software design.

Finally, the electronic, hand-held game apparatus of the present invention preferably has a housing 22 which is formed with easily gripped surfaces on back side 34 of the housing. In the preferred form convex surfaces 48 and 49 protrude from back side 34 of housing 22. Surfaces 48 and 49 extend transversely across the housing to assist in gripping housing 22. This enables the user to reduce the pressure of the grip on the housing and thereby enables better control of the switch assemblies 26 and 27. As best will be seen, the convex or arcuate surfaces 48 and 49 are subjacent the switch assemblies so that the thumbs can operate switch assemblies 26 and 27 while fingers 33 of the hands engage surfaces 48 and 49.

Game apparatus 21 also includes "on" button 42 and "off" button 43 which are positioned on a first side of screen 23, and three switches 44, 45 and 46 positioned on a second or opposite side of screen 23. As above described, when switches 44 and 45 are depressed simultaneously, they invert the display of images 24. Switch 45 when pressed alone is a "pause" switch, and when switches 45 and 46 are simultaneously pressed, the game is restarted. As will be apparent, therefore, switches 42–46 generally are not used to control image movement as part of the play of games.

Accordingly, the hand-held electronic game assembly of the present invention can be easily inverted for right-handed or left-handed play. Moreover, it can be used with software employing vertically oriented images, and it can be inverted in either the horizontal or vertical orientation to facilitate easy operation by right-handed and left-handed players. The game assembly housing also is easily gripped, and several hand positions are possible while still being able to manipulate the control switches. This reduces hand fatigue when playing with the game assembly and increases the dexterity of manipulation of the control switches.

The greatly improved ergonomics of the game apparatus housing and switch assemblies also makes possible the use of game software in which the game apparatus housing must be inverted during play of the game. Thus, under certain game conditions, the player may have to rapidly invert the housing and continue play. Similarly, software requiring the passing of the game apparatus from one player to the next during play can be accommodated since rapid switching between right-hand and left-handed play can be accomplished.

What is claimed is:

1. A hand-held electronic game apparatus including a manually engageable housing, a display screen mounted in said housing, and control switch means mounted to said housing and electrically connected for manipulation of movable images displayed on said display screen by at least one hand of a player while holding said housing, wherein the improvement comprises:

said housing being formed for gripping by said player while oriented in two different positions with one of said positions being rotated about an axis normal to said display screen relative to the other of said positions;

said control switch means being positioned relative to said housing to permit rotation of said housing between said two different positions and to enable manipulation of said control switch means by one hand of said player in each of said two different positions, and circuit means operable in response to player input independently of operation of said control switch means, said circuit means being formed and electrically connected for rotation of the orientation of all images on said display screen about said axis by an amount corresponding to rotation of said housing for selective use of said game apparatus in either of said two different positions.

2. The hand-held electronic game apparatus as defined in claim 1 wherein, said control switch means includes a joypad control switch assembly and a fire switch means, said housing is elongated with said display screen centrally located therein, said joypad control switch assembly is positioned on one side of said display screen, said fire switch means is positioned on an opposite side of said control screen, and said circuit means, when input by said player to rotate all images on said display screen, further is electrically connected to and reverses the directions of right and left motion of movable images on said display screen and reverses the directions of up and down motion of movable images on said display screen produced by player input to said joypad control switch assembly.

3. The hand-held electronic game apparatus as defined in claim 2 wherein, said fire switch means is provided as two fire switches having the same image control function over the same image with one of said fire switches positioned proximate an upper side and another of said fire switches positioned proximate a lower side of said housing, said fire switches being further positioned proximate one end of said housing, and said joypad control switch assembly is positioned centrally of said sides of said housing proximate an opposite end of said housing.

4. The hand-held electronic game apparatus as defined in claim 3 wherein, said fire switch means is provided as two pairs of fire switches with a pair of fire switches having the same image control functions over the same images proximate each side of said one end of said housing;

said fire switches all are simultaneously activated for use of any fire switch by the player.

5. The hand-held electronic game apparatus as defined in claim 3 wherein, said housing includes gripping surfaces on a backside thereof opposite said display screen, said gripping surfaces being formed to facilitate holding of said housing by the opposite ends thereof.

6. The hand-held electronic game apparatus as defined in claim 5 wherein, said gripping surfaces are provided by convex transversely extending surfaces proximate said opposite ends.

7. The hand-held electronic game apparatus as defined in claim 1 wherein, said circuit means for rotating all images on said display screen includes switch means extending to an exterior of said housing for player input, and an electronic circuit formed to rotate all images displayed on said screen by 180° upon input by said player.

8. The hand-held electronic game apparatus as defined in claim 1 wherein, said control switch means includes a thumb-actuated joypad switch assembly having a plurality of control directions and located on a central plane of said housing on a first side of said display screen;

two pairs of fire switch assemblies with each pair of fire switch assemblies being located in substantially equidistant spaced apart relation from said central plane of said housing on a second side of said display screen; and said circuit means for rotating all images on said display screen further is formed for and, upon input by said player to rotate all images, simultaneously reverses control of right and left motion and reverses the control of up and down motion of movable images produced by player input to said joypad switch assembly.

9. The hand-held electronic game apparatus as defined in claim 8 wherein, said housing is formed with a protruding convex transversely extending surface on a back side thereof subjacent each of said joypad switch assembly and said pairs of fire switch assemblies.

10. An invertible hand-held game apparatus comprising:

an elongated housing having opposite ends;

an image display screen mounted in said housing centrally of said opposite ends;

electronic circuit means electrically connected to drive said display screen;

a manually manipulatable first control switch means electrically connected to said circuit means and controlling a first aspect of movement of movable images displayed on said display screen of said game apparatus, said first control switch means being mounted on said housing on a first side of said display screen at about a mid-plane of said housing;

a manually manipulatable second control switch means electrically connected to said circuit means and controlling a second aspect of movement of movable images displayed on said display screen of said game apparatus, said second control switch means being mounted on a second side of said display screen from said first control switch assembly; and image display rotation switch means electrically connected to said circuit means and inverting the display of all images on said screen upon player input to permit right-handed and left-handed play of said game apparatus.

11. The invertible hand-held game apparatus as defined in claim 10 wherein, said second control switch means includes four manually manipulatable switch assemblies positioned symmetrically about said mid-plane of said housing on said opposite side of said display screen.

12. The invertible hand-held game apparatus as defined in claim 10 wherein, said first control switch means is a joypad switch assembly having a plurality of switches controlling right and left motion and up and down motion of movable images on said display screen; and means responsive to player input electrically connected to said joypad switch assembly and selectively reversing the directions of control of right and left motion and reversing the directions of control of up and down motion of said movable images.

13. A hand-held electronic game apparatus including a manually engageable housing, a display screen mounted in said housing, and movable image control switch means mounted to said housing for manipulation by at least one hand of a player while holding said housing, said movable image control switch means being electrically connected and responsive to input by a player to manipulate movable images displayed on said screen relative to stationary images displayed on said screen, wherein the improvement comprises:

said housing being formed for gripping by said player with said screen in a vertical orientation and for gripping by said player with said screen in a horizontal orientation; and said movable image control switch means being carried by said housing at a position for manipulation by at least one hand of said player when said screen is in each of said vertical orientation and said horizontal orientation.

14. The game apparatus as defined in claim 13 wherein, said movable image control switch means includes a joypad control switch assembly positioned proximate one end of said housing at about a mid-plane of said housing; and said movable image control switch means further includes a first fire button switch positioned proximate an opposite end of said housing and proximate a one side of said housing, and a second fire button switch positioned proximate said opposite end of said housing and proximate and opposite side of said housing.

15. The game apparatus as defined in claim 14 wherein, said movable image control switch means includes a third fire button switch positioned proximate said first fire button switch and a fourth button switch positioned proximate said second fire button switch.

16. The game apparatus as defined in claim 13 wherein, said housing is formed for rotation of a first horizontal orientation about an axis normal to said screen by 180° to an inverted second horizontal orientation of said screen and is formed for gripping by said player in each of said first horizontal orientation and said second horizontal orientation; and said housing also is formed for rotation from a first vertical orientation about an axis normal to said screen by 180° to an inverted second vertical orientation of said screen and is formed for gripping by said player in each of said first vertical orientation and said second vertical orientation; and circuit means responsive to player input and electrically connected to rotate the orientation of movable images and stationary images displayed on said display screen by an amount corresponding to rotation of said housing for selective use of said game apparatus in any one of said first horizontal orientation, said inverted second horizontal orientation, said first vertical orientation and said inverted second vertical orientation.

17. The game apparatus as defined in claim 16 wherein, said movable image control switch means includes a multi-directional image control switch assembly having a right input switch operating to control movement of movable images to the right on said screen, a left input switch operating to control movement of movable images to the left on said screen, an up input switch operating to control movement of movable images in an upward direction on said screen, and a down input switch operating to control movement of movable images in a downward direction on said screen; and said circuit means for rotating movable and stationary images further includes means responsive to user input for simultaneously changing said right input switch to operate as a left input switch and said left input switch to operate as a right input switch, and further for simultaneously changing said up input switch to operate as a down input switch and said down input switch to operate as an up input switch.

18. A hand-held electronic apparatus including a housing adapted to be hand-held, a display screen mounted to the housing, a processor for providing a display on the display screen, and a manually operable motion control mounted in the housing for controlling motion of images on the display, the hand-held electronic apparatus further comprising:

a manually operable inversion switch mounted in the housing;

means for inverting the display in response to operation of the inversion switch; and means for inverting the operation of the manually operable motion control in response to operation of the inversion switch.

19. A hand-held electronic apparatus as in claim 10 wherein said manually operable motion control is positioned in the housing for operation by one hand of a user and the housing is adapted such that the one hand may support the housing while operating the manually operable motion control, the hand-held electronic apparatus further comprising another manually operable control for providing a control signal to the processor, the other manually operable control positioned in the housing for operation by the other hand of the user and the housing adapted such that the other hand may support the housing while operating the other manually operable control.

20. A hand-held electronic apparatus as in claim 19 wherein the display screen is positioned between the manually operable motion control and the other manually operable control.

* * * * *